United States Patent [19]

Gebhard et al.

[11] Patent Number: 4,533,532

[45] Date of Patent: Aug. 6, 1985

[54] CARBOXYLIC ACID ACTIVATED DRY CALCIUM ABSORBENT METHOD FOR REMOVING SULFUR DIOXIDE FROM A FLUE GAS

[75] Inventors: Georg R. U. Gebhard, Reichshof; Klaus R. G. Hein, Bergheim-Ahe; Wolfgang Glaser, Frechen, all of Fed. Rep. of Germany

[73] Assignee: Rheinisch-Westfallisches Elektrizitatswerk Aktiengesellschaft, Essen, Fed. Rep. of Germany

[21] Appl. No.: 626,652

[22] Filed: Jul. 2, 1984

Related U.S. Application Data

[62] Division of Ser. No. 526,907, Aug. 26, 1983.

[30] Foreign Application Priority Data

Aug. 28, 1982 [DE] Fed. Rep. of Germany ....... 3232081

[51] Int. Cl.$^3$ ............................................. B01D 53/34

[52] U.S. Cl. .................................... 423/244; 423/240; 423/243; 110/345

[58] Field of Search .................. 423/210, 240, 242 A, 423/242 R, 243, 244 A, 244 R; 252/190, 192; 44/1 R, 15 R, 4, 6; 110/341–345

[56] References Cited

U.S. PATENT DOCUMENTS

| 3,642,445 | 2/1972 | Muter et al. ..................... 423/244 A |
| 3,833,508 | 9/1974 | Austin et al. ........................ 252/189 |
| 4,308,808 | 1/1982 | Brown ................................. 110/342 |

*Primary Examiner*—Earl C. Thomas
*Attorney, Agent, or Firm*—Karl F. Ross; Herbert Dubno

[57] ABSTRACT

An absorbent for the dry removal of sulfur dioxide and other noxious and toxic components from a combustion flue gas which consists essentially of at least one finely divided alkaline-earth compound and an additive selected from the group which consists of at least one carboxylic acid or an alkali metal, alkaline-earth metal or ammonium salt thereof.

5 Claims, No Drawings

CARBOXYLIC ACID ACTIVATED DRY CALCIUM ABSORBENT METHOD FOR REMOVING SULFUR DIOXIDE FROM A FLUE GAS

CROSS REFERENCE TO RELATED APPLICATIONS

This application is a division of Ser. No. 526,907 filed Aug. 26, 1983 and is related to the commonly assigned copending application Ser. No. 526,903 filed Aug. 26, 1983 based upon German application P 32 32 077.9; Ser. No. 526,886 filed Aug. 26, 1983 based upon German application P 32 32 079.5; Ser. No. 526,904 filed Aug. 26, 1983 based upon German application P 32 32 080.0; and Ser. No. 526,910 filed Aug. 26, 1983 based upon German application P 32 32 078.7; all of these German applications having been filed Aug. 28, 1982.

FIELD OF THE INVENTION

The present invention relates to an absorbent for the dry removal of sulfur dioxide especially, and other toxic or noxious components, from a waste gas and especially a furnace exhaust gas.

BACKGROUND OF THE INVENTION

It is known to introduce a pulverulent, granular or other finely divided solid absorbent into a furnace exhaust gas system, e.g. a furnace exhaust gas generated in the operation of a water boiler and especially the flue gases of a power plant boiler, to absorb sulfur dioxide and other toxic and noxious components of the flue gas.

In the dry process for removal of such components, the particulate absorbent is brought into contact with the flue gas for a period sufficient to enable absorption and even reaction of the sulfur dioxide with the absorbent, whereupon the solids are separated from the remaining portions of the flue gas by dry separation techniques.

Dry separation techniques include direction-change, impingement baffle, velocity-change and centrifugal separators as well as particle-trapping filters and electrostatic precipitators.

The absorbents hitherto used in the removal of sulfur dioxide from power plant boiler flue gases are generally finely divided inorganic alkaline-earth compounds especially calcium and/or magnesium compounds such as the calcium and/or magnesium oxides, hydroxides or carbonates. When reference is made to an absorbent compound, therefore, these compounds and especially the calcium compounds and particularly calcium carbonate are intended.

It is known to improve the absorption interaction of the particulate absorbent with the flue gas by including additives in the absorbent in the form of the halogen acids and halide salts. This approach, however, is disadvantageous in some cases because of the danger of release into the atmosphere of the additives or components thereof.

Nonetheless such additives are used because they do improve the reactivity of the absorbent.

Mention should also be made of the fact that there are numerous processes for the cleaning of flue gases from fossil-fuel fired boilers. The particular absorbent used will depend in each case upon the nature of the reaction desired with the components to be removed from the flue gases.

In general, one can distinguish between the wet and dry processes.

In the wet process, the gas is treated with a liquid, i.e. is scrubbed with a scrubbing solution, the liquid containing the absorbent in solution or in suspension.

In the dry process, however, the absorbent is introduced during the firing or immediately thereafter and, since the absorbent can be present in the combustion chamber, it may be added to the fuel (U.S. Pat. No. 4,262,610).

An advantage of the latter procedure is that the absorption commences as soon as the noxious or toxic compounds are formed.

The wet processes have the advantage of high efficiency, since the scrubbing operation contributes to the removal of the toxic and noxious compounds beyond the absorption reaction, although these procedures have the disadvantage of high capital cost, greater maintenance requirements for the equipment and an undesired cooling of the flue gases which may require them to be reheated if further processing is necessary or desired. Consequently, in many instances, the dry process is preferred.

The dry processes used heretofore, however, have been found to have relatively low efficiency, especially when applied to the removal of sulfur dioxide and other noxious or toxic components from the flue gases of power plant boilers. The poor efficiency appears to be a result of the relatively short contact time between the absorbent and the flue gases, even when the absorbent is present in the fuel and the contact time begins immediately upon combustion.

For a sufficient degree of removal of the toxic and noxious components, therefore, comparatively large quantities of absorbent must be used and this, of course, results in high operating cost.

Naturally it is important not to overload the combustion operation with excessive absorbent.

Consequently, operations heretofore in the dry process have had to balance the desire to avoid emissions to the environment which might be detrimental with the need to avoid destructive action with respect to the combustion, and with the need to ensure sufficient or satisfactory removal of the noxious and toxic components from the flue gases.

OBJECTS OF THE INVENTION

It is the principal object of the present invention to provide an absorbent for the dry removal of sulfur dioxide and other noxious and toxic components from the flue gases of a boiler combustion chamber, especially a power plant boiler, which has an especially high reactivity or absorption efficiency, and which does not create an emission problem with respect to the environment.

Another object of the invention is to provide an improved method of operating a dry process for the removal of sulfur dioxide and other toxic and noxious components from the flue gases of a power plant boiler.

It is also an object of this invention to provide an improved method of removing sulfur dioxide from such flue gases.

DESCRIPTION OF THE INVENTION

These objects and others which will become apparent hereinafter are attained, in accordance with the present invention, in an absorbent of the class described which comprises at least one of the absorbent compounds previously mentioned and wherein the additive is one or more carboxylic acids and/or an alkali metal salt, am ammonium salt or alkaline-earth metal salt thereof.

We have discovered, quite surprisingly, that the use of a carboxylic acid or a plurality of carboxylic acids and/or their described salts as additives to the finely divided inorganic alkaline-earth compounds forming absorption agents for the dry removal of a sulfur dioxide and other toxic and noxious components from the flue gases of a boiler combustion chamber, greatly improves the reactivity of the absorbent while avoiding the addition of any change which may increase environmental pollution hazards.

Preferably, the absorbent containing the additive is combined with a fuel, e.g. coal, before the mill drying thereof and most preferably it is combined with the brown coal or low organic solid-fossil fuels utilized to fire a power plant boiler as described in German Pat. No. 28 07 076 and the corresponding U.S. Pat. No. 4,262,610.

The main component of the absorbent can consist of calcium carbonate as is customary and the preferred additive is acetic acid or one of the described salts thereof. The additive can be present in an amount between 0.1 and 10 mol % of the inorganic absorbent compound, preferably in an amount between 1 and 5 mol % thereof.

The formation of the absorbent can use any conventional mixing or blending technique. However, it has been found to be advantageous to dissolve the additive in water, to mix it with the finely divided inorganic compound, and then to dry the mixture. The mixing is especially intensive when the solution of the additive is sprayed upon the finely divided main component which retains a solid-phase structure. It is possible that the additive reacts with the alkaline-earth compond to form a stable reaction product and, after drying, the reaction product appears to have the particle size distribution and surface area properties of the finely divided alkaline-earth compounds. This facilitates removal of the solids from the flue gases after interaction.

When the absorbent is to be introduced into the flue gases (rather than the fuel), it is injected at atmospheres between 100° and 1100° C., preferably at a temperature of 100° to 700° C.

To the extent that the absorbent does not fully react, it can be recycled to the flue gases after the removal therefrom.

The absorbent of the invention has been found to have especially high efficiency and to be capable of desulfurization of flue gases without contributing to environmental pollution.

Even if one operates at temperatures at which the additive decomposes, its decomposition products are only carbon dioxide and water which are not environmental pollutants.

When the absorbent according to the invention is in the form of a compound between the alkaline-earth compound and the additive, an additional advantage is obtained in that spontaneous decomposition of the reaction produce increases the contact surface of absorption of the toxic and noxious components. The toxic and noxious components which are absorbed in addition to sulfur dioxide include fluorine and chlorine compounds produced in the combustion process.

SPECIFIC EXAMPLES

The following comparative examples illustrate the invention.

The dry desulfurization process (see the aforementioned patent) is used and the absorbent (absorbent 1), for comparative purposes, is an untreated calcium hydroxide ($Ca(OH)_2$) while absorbent 2 is the same calcium hydroxide combined with 5% acetic acid. The table demonstrates the increase in the absorption capacity utilizing a carboxylic acid treated absorbent. The improvement in desulfurization is about 10%.

| | | Degree of Flue-gas Composition | | | Desulfurization % |
|---|---|---|---|---|---|
| | | $SO_2$ mg/m$^3$ | $CO_2$ Vol. % | $O_2$ Vol. % | |
| A | Without Absorbent | 7675 | 13.9 | 5.9 | — |
| B | Absorbent 1 | | | | |
| | 4.8% additive of $Ca(OH)_2$ to fuel | 1390 | 13.7 | 6.1 | 81.6 |
| A | Without Absorbent | 7620 | 14.0 | 5.8 | — |
| B | Absorbent 2 | | | | |
| | 4.8% additive of $Ca(OH)_2$ reacted with acetic acid to fuel | 840 | 13.8 | 6.0 | 88.8 |

Similar results are obtained when CaO and $CaCO_3$ are substituted for $Ca(OH)_2$ and when sodium, ammonium and calcium acetate are substituted for the acetic acid.

We claim:
1. A method of removing sulfur dioxide and other noxious and toxic components from the flue gas of a power plant boiler which comprises the steps of:
   (a) forming an absorbent by intimately mixing at least one alkaline-earth compound capable of absorbing sulfur dioxide with 0.1 to 10 mol % of an additive consisting of at least one absorbent-reactivity promoting carboxylic acid or an alkali metal, alkaline-earth metal or ammonium salt thereof;
   (b) forming the flue gas by combustion of a fuel in a power plant boiler;
   (c) contacting the flue gas after its formation in said boiler at an elevated temperature with absorbent formed in step (a) in a dry state and added to said flue gas independently of said combustion; and
   (d) dry separating the absorbent after it has contacted the flue gas in step (c) from the remainder of the flue gas.

2. The method defined in claim 1 wherein said alkaline-earth carbonate is calcium carbonate.

3. The method defined in claim 2 wherein said absorbent contains 0.1 to 5 mol % of acetic acid.

4. The method of removing sulfur dioxide and other noxious and toxic components from a flue gas of a power plant boiler which comprises the steps of:
   (a) forming an absorbent by intimately mixing at least one alkaline-earth compound capable of absorbing sulfur dioxide with 0.1 to 10 mol % of an additive consisting of acetic acid or an alkaline metal, alkaline-earth metal or ammonium salt thereof;
   (b) contacting the flue gas after its formation by combustion and in a drying state to an elevated temperature with the absorbent formed in step (a); and
   (c) dry separating the absorbent after it has contacted the flue gas in step (c) from the remainder of said flue gas.

5. The method defined in claim 4 wherein said alkaline-earth compound is calcium carbonate.

* * * * *